United States Patent
Yang et al.

(10) Patent No.: US 9,361,045 B1
(45) Date of Patent: Jun. 7, 2016

(54) CONSTRUCTING VIRTUAL STORAGE NETWORKS FOR MULTIPLE TENANTS WITH QUALITY-OF-SERVICE DELIVERY

(71) Applicant: EMC Corporation, Hopkinton, MA (US)

(72) Inventors: Ziye Yang, Shanghai (CN); Chenhui Fan, Shanghai (CN); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 281 days.

(21) Appl. No.: 13/804,194

(22) Filed: Mar. 14, 2013

(51) Int. Cl.
*G06F 15/173* (2006.01)
*G06F 3/06* (2006.01)

(52) U.S. Cl.
CPC ............ *G06F 3/0665* (2013.01); *G06F 3/0619* (2013.01); *G06F 3/0689* (2013.01)

(58) Field of Classification Search
None
See application file for complete search history.

(56) References Cited

U.S. PATENT DOCUMENTS

2011/0296230 A1* 12/2011 Chen et al. ............. 714/3
2013/0067540 A1* 3/2013 Mukkara et al. .......... 726/4

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.
Wikipedia, "NPIV," http://en.wikipedia.org/wiki/NPIV, Jul. 8, 2014, 1 page.
Scott's Weblog, "Understanding NPIV and NPV," http://blog.scott-lowe.org/2009/11/27/understanding-npiv-and-npv/, Nov. 27, 2009, 5 pages.

* cited by examiner

*Primary Examiner* — Ryan Jakovac
(74) *Attorney, Agent, or Firm* — Ryan, Mason & Lewis, LLP

(57) ABSTRACT

Techniques for constructing virtual storage networks for tenants with quality-of-service delivery. In one example, a method comprises the following steps. One or more virtual storage networks are constructed respectively for one or more tenants of a data storage system. Each of the one or more virtual storage networks is tenant-managed and is configured such that logical resources of the tenant-managed virtual storage network are isolated from physical resources used to implement the logical resources.

20 Claims, 4 Drawing Sheets

NPIV

NPV

US 9,361,045 B1

CONSTRUCTING VIRTUAL STORAGE NETWORKS FOR MULTIPLE TENANTS WITH QUALITY-OF-SERVICE DELIVERY

FIELD

The field relates to data storage systems, and more particularly to techniques for constructing virtual storage networks for tenants with quality-of-service delivery.

BACKGROUND

N-Port ID Virtualization (NPIV) is an American National Standards Institute (ANSI) T11 standard that describes how a Fibre Channel (FC) network port (N-port) can register with the FC fabric using several worldwide port names (WWPNs). This allows a fabric-attached N-port to claim multiple fabric addresses, which may be considered as virtual WWPNs. Each address appears as a unique entity on the FC fabric. The N-port is considered to be an end node in the FC fabric, wherein the port can be a host bus adapter (HBA) port or a target port on a storage array.

When NPIV is supported on the initiator side (i.e., on the HBA side), then each virtual machine (VM) can have its own virtual WWPN and N-port identifier (N_PORT_ID). Recently, NPIV on the host side has been considered as implicit HBA virtualization, as VMs are not provided with the virtual HBAs. If the physical switch also supports NPIV, then each VM has the ability to view the physical storage fabric.

On the switch side, there are physical switches supporting N-Port Virtualization (NPV), which can reduce the amounts of domain identifiers (IDs) but retain the scalability of fabric switches. However, no software (virtual) storage switches are provided. On the target side of the data storage system, virtualization techniques are not developed, and thus NPIV is not typically utilized. Traditional zoning (including both hardware and software) and logical unit (LUN) masking techniques cannot fully satisfy the requirements of multi-tenancy in a cloud computing scenario since the tenants still have the ability to probe the physical storage infrastructures.

SUMMARY

Embodiments of the invention provide techniques for constructing virtual storage networks for tenants with quality-of-service delivery.

In one embodiment, a method comprises the following steps. One or more virtual storage networks are constructed respectively for one or more tenants of a data storage system. Each of the one or more virtual storage networks is tenant-managed and is configured such that logical resources of the tenant-managed virtual storage network are isolated from physical resources used to implement the logical resources.

In another embodiment, a computer program product is provided which comprises a processor-readable storage medium having encoded therein executable code of one or more software programs. The one or more software programs when executed by at least one processor implement steps of the above-described method.

In yet another embodiment, an apparatus comprises a memory and a processor operatively coupled to the memory and configured to perform steps of the above-described method.

In a further embodiment, a data storage system comprises a first virtual storage network and at least a second virtual storage network. The first virtual storage network and the second virtual storage network are provisioned respectively for a first tenant and a second tenant of the data storage system, wherein the first virtual storage network and the second virtual storage network are tenant-managed and are configured such that logical resources of each of the tenant-managed virtual storage networks are isolated from physical resources used to implement the logical resources.

Advantageously, illustrative embodiments described herein provide techniques for ensuring quality-of-service delivery in multi-tenant virtual storage network environments while preventing tenants from accessing the physical infrastructure upon which the tenant-managed virtual storage networks are implemented.

These and other features and advantages of the present invention will become more readily apparent from the accompanying drawings and the following detailed description.

DETAILED DESCRIPTION

Figure 1:
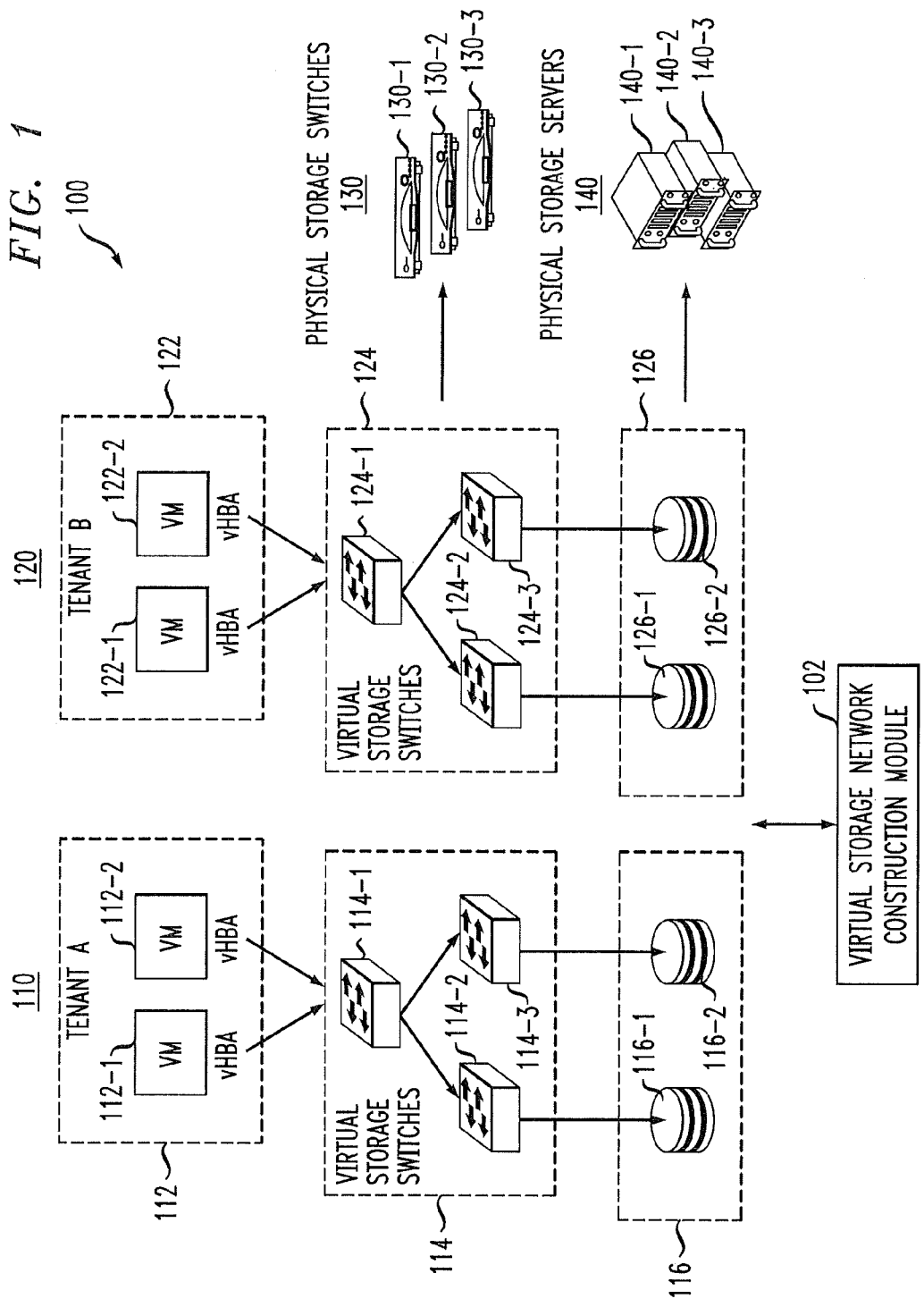
FIG. 1 illustrates a system environment for constructing virtual storage networks in accordance with one embodiment of the invention.

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the phrase "quality-of-service" (QoS) refers to resource control mechanisms. For example, QoS is the ability to provide different resource reservation priorities to different entities such as, but not limited to, applications, users, devices and data flows, or to guarantee a certain level of performance to one or more of such entities. By way of example only, a required bit rate, delay, jitter, packet dropping probability and/or bit error rate may be guaranteed.

Embodiments of the invention provide techniques to integrate virtualization techniques (such as, for example, NPIV and NPV) into the FC fabric such that a virtual and isolated storage network is constructed and available to each tenant of a data storage system with QoS delivery. The data storage system can be considered a "cloud computing infrastructure" or a "distributed virtual infrastructure." The term "tenant" refers to a user of the data storage system, wherein the system is maintained by an infrastructure provider entity (e.g., cloud provider) allowing the tenant to utilize the system as part of a chargeable service. As will be explained in detail below, each tenant is provided with a virtual storage network wherein the multiple virtual storage networks collectively comprise a data storage system.

More specifically, embodiments of the invention partition physical storage servers/arrays and provision virtual storage servers to different tenants, thus each tenant can manage their own virtual arrays and thus have their own virtual storage network. Each virtual storage server/array is equipped with virtual <N_PORT_ID, WWPN> pairs, which are not bounded to the physical storage servers. NPIV techniques are used to manage the mapping between the virtual identifiers and the physical resources. Thus, tenants cannot probe the physical infrastructures provisioned by the infrastructure provider entity.

Furthermore, embodiments of the invention provide virtual (software) storage switches to the tenants. When a virtual storage network increases, virtual storage switches are provided for the tenant to manage his/her own storage network. The functionalities of virtual storage switches can be implemented in both software and physical switches. The physical switches recognize the mappings between the virtual <N_PORT_ID, WWPN> pairs to the correct F-port (fabric port). Thus, commands or data can be correctly dispatched to the destination. As such, QoS is provided for each virtual storage network.

FIG. 1 illustrates a system environment for constructing virtual storage networks in accordance with one embodiment of the invention. It is to be appreciated that the components of the networks shown in FIG. 1 are intended to illustrate the virtual storage network construction methodologies and are not necessarily intended to be full architectures of the networks. As depicted in system environment 100, methodologies for constructing the virtual storage networks are performed by a virtual storage network construction module 102. The multiple virtual storage networks constructed by module 102 are collectively part of a data storage system.

As shown, a first virtual storage network 110 for tenant A includes: a set of virtual HBAs 112 including vHBA 112-1 and vHBA 112-2; a set of virtual storage switches 114 including virtual switch 114-1, virtual switch 114-2, and virtual switch 114-3; and a set of virtual storage servers 116 including virtual storage array 116-1 and virtual storage array 116-2. Similarly, a second virtual storage network 120 for tenant B includes: a set of virtual HBAs 122 including vHBA 122-1 and vHBA 122-2; a set of virtual storage switches 124 including virtual switch 124-1, virtual switch 124-2, and virtual switch 124-3; and a set of virtual storage servers 126 including virtual storage array 126-1 and virtual storage array 126-2. It is to be appreciated that the number of vHBAs, virtual switches, and virtual storage arrays are arbitrarily illustrated in FIG. 1, and do not necessarily indicate actual numbers of such virtual storage network components for each tenant.

Also shown in system environment 100 are the physical resources upon which the virtual components are implemented, e.g., physical storage switches 130 including 130-1, 130-2, and 130-3; and physical storage servers 140 including 140-1, 140-2, and 140-3. Again, the number of physical resources shown in FIG. 1 is for illustration purposes only.

While system environment 100 illustrates two virtual storage networks (110 and 120), it is to be appreciated that any number of tenant networks can be provisioned (constructed) by module 102.

Accordingly, as shown in system environment 100, each tenant has its own vHBAs which can be both explicit and implicit, virtual storage switches and virtual storage servers. The tenant can manage all the resources with the freedom to configure the resources. To achieve this functionality, embodiments of the invention integrate storage network virtualization techniques in the initiator side, the switch side, and also the target side. We now describe illustrative functions that the virtual storage network construction module 102 uses to implement such integration of storage network virtualization.

Virtual storage server/array provisioning. When a tenant adds a new virtual storage server (vStorage-server) with certain specified requirements (e.g., capacity, input/output operations per second (IOPS_, etc.), the infrastructure provider allocates the I/O resources from physical storage servers (e.g., LUNs or sub-LUNs) to provision it. When a vStorage-server is allocated to a tenant, it can be assigned with one or more virtual <WWPN, N_PORT_ID> pairs. Backend storage servers manage the storage mapping relationships between vStorage-servers and physical servers, and direct the operations from the vStorage-servers to physical servers.

Virtual switch provisioning. As is well known, each physical switch in the fabric of a Fibre Channel has F_PORTs and E_PORTs. The F_PORT is designed to connect to the N_PORT, and switches can be connected by the E_PORTs. In accordance with embodiments of the invention, for virtualizing the features of physical switches, each virtual switch is provided with virtual ports (e.g., F_PORTs, E_PORTs) and supports features or functionalities of physical switches. Also backend software maintains the relationships from virtual F_PORTs/E_PORTs to real ones. (e.g., maintaining the virtual address in the storage network to the real address).

Virtual storage network provisioning. To maintain the topology of the virtual storage network and map the logical storage paths to the real ones, the following features are provided in accordance with embodiments of the invention:

(1) Connection/disconnection operations between virtual N_PORTs and F_PORTs. For example, when a virtual N_PORT (a virtual HBA of a vStorage-server) is connected to a virtual F_PORT, the management software maps the virtual connection path to the real path.

(2) Connection/disconnections operations between two virtual E_PORTs. For example, when two virtual E_PORTs are connected, the management software is notified and maps the connections between the two virtual switches to the real ones. With such features, cascaded virtual switches can be provided to support large-size virtual storage network.

(3) Software configurations on virtual switches. Such operations are intercepted and dispatched to the corresponding management software. When the corresponding software is notified with such information, it updates the rules (e.g., mapping relationships between the virtual pair <WWPN, N_PORT_ID> with the physical F_PORTs) in some physical switches, then data issued by the vStorage-server can be successfully delivered to the destination. But from the view of tenants, they just operate on the virtual storage switches.

Data delivery through virtual switches. With the basic functions provided by virtual storage switches, the data delivery in the virtual storage network is not complicated, which can be described in the following steps (assuming virtual switches are needed):

(1) When data is sent by a tenant from a virtual N_PORT to a virtual switch (e.g., one of the virtual switches 114 or 124 in FIG. 1), it is intercepted and encapsulated according to the protocol requirements through access layer virtualization (e.g., NPIV technique), then delivered through a physical path.

(2) When data arrives at a middle node (e.g., a physical switch, e.g., one of the physical switches 130 in FIG. 1), the data is handled by the management software and propagated to the virtual switch (owned by the tenant) with some de-capsulation operations. Then, the virtual switch forwards the data according to its own dispatching rules defined by the tenant. Such data is intercepted and encapsulated by the management software again, then delivered by the physical switches to the correct physical path.

(3) When data arrives at the destination side (e.g., one of the virtual storage arrays 116 or 126 in FIG. 1), the data is de-capsulated by the access layer virtualization and passed to the correct virtual N_PORT according to the virtual <WWPN, N_PORT_ID> pairs.

QoS control. Management software that supports the virtual storage networks owned by different tenants provides the additional features to different tenants: (1) monitoring data flows of each tenant; (2) providing context-aware data routing policies to different tenants according to different storage IOPS requirements; and (3) reasonably partitioning the bandwidth among different tenants.

Figure 2:
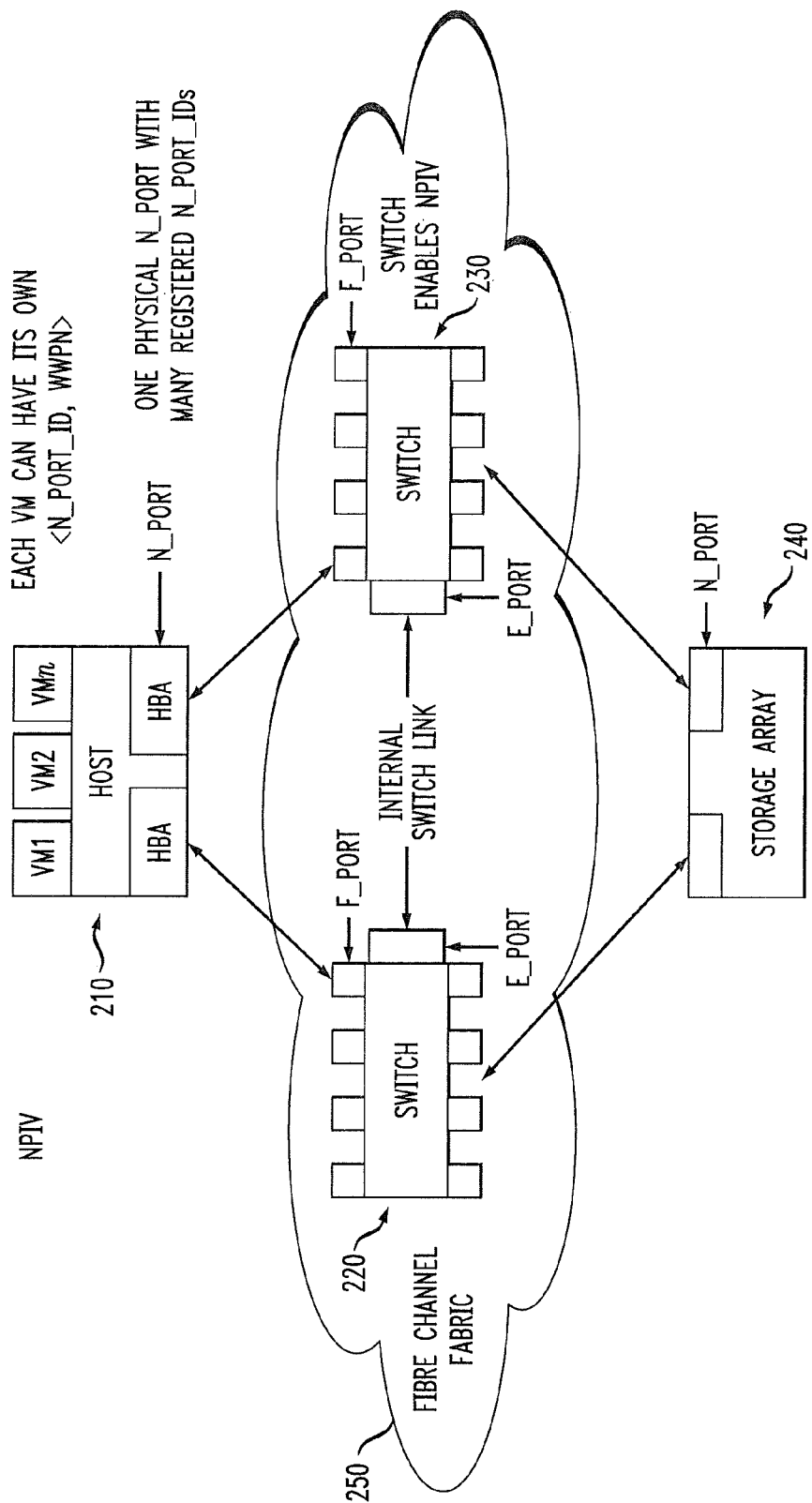
FIG. 2 illustrates an NPIV architecture adaptable for use in accordance with one embodiment of the invention.

It is realized that with NPIV, a physical N_PORT can be registered with many N_PORT_IDs, as shown in FIG. 2. In the diagram, each VM (VM1, . . . , VMn) on a host 210 (equipped with a real HBA) can have its own N_PORT_ID and WWPN. Also, the switches 220 and 230 in the FC fabric 250 that connect to the host 210 support NPIV, or else the switches would not know the correct destination, e.g., storage array 240, to which to deliver the packets.

Figure 3:
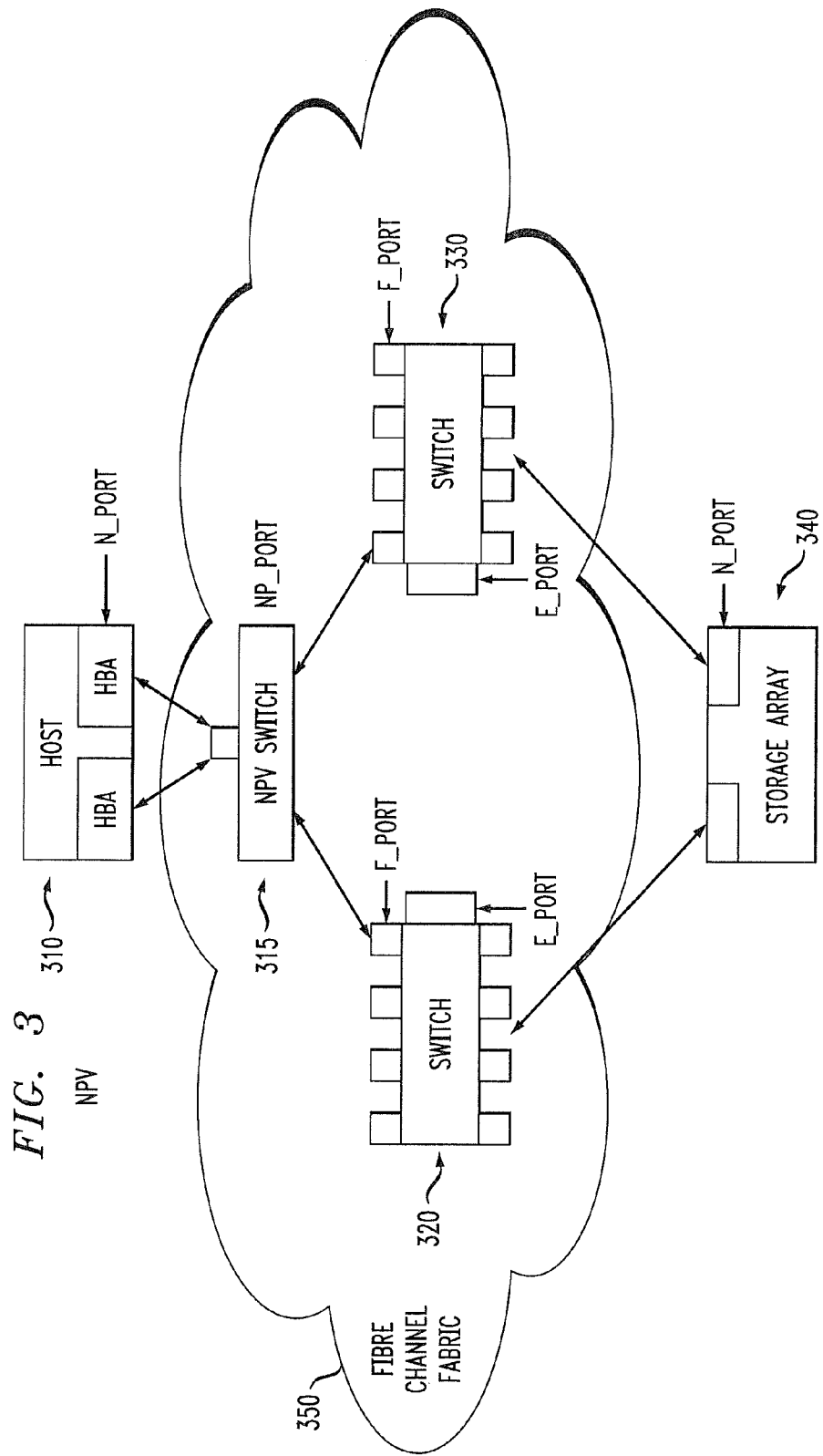
FIG. 3 illustrates an NPV architecture adaptable for use in accordance with one embodiment of the invention.

Furthermore, it is realized that when there is no NPV-enabled switch, there exists the following dilemma; (1) reducing the number of switches in order to maintain a low number of domain IDs; and (2) increasing the number of switches for scaling purpose, i.e., to support more ports. Thus, it is realized that an NPV switch can solve such problems, as illustrated in FIG. 3. As shown, a host 310 is connected to two virtual switches 320 and 330 via an NPV switch 315. The other sides of the virtual switches 320 and 330 connect with storage array 340. Switches 315, 320 and 330 reside as part of the FC fabric 350. As shown, the NP_PORT on the NPV switch 315 connects the N_PORT from the host 310 and the backend port on NPV switch 315 connects to the F_PORT in the traditional switch (320 or 330). In general, the NPV switch 315 appears as an NPIV-host and, as such, no longer needs a domain ID to add itself to the switch fabric.

Accordingly, embodiments of the invention enables NPIV virtualization techniques on the target side (e.g., storage array) and integrates virtualization techniques on the initiator and switch side. As such, an isolated storage environment including virtual storage servers, virtual switches, and virtual HBAs can be provisioned to tenants With the application of virtualization on the initiator and switch side, each tenant can manage the provisioned storage network similar to a physical network, but is given no information regarding the backend infrastructures provisioned by the cloud (infrastructure) provider, i.e., the physical and logical resources are fully decoupled (isolated). Also with such solutions, cloud providers can transparently migrate the virtual storage networks belonging to a tenant, and the tenant requires no re-configuration operations.

Figure 4A:
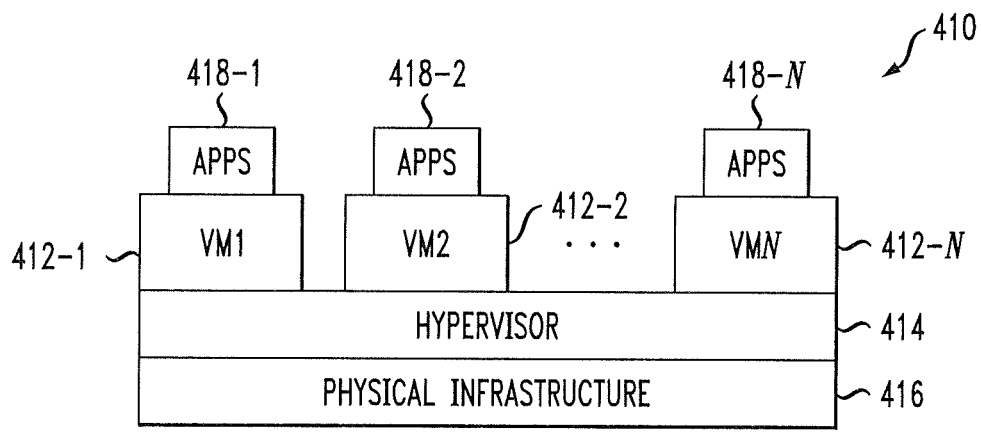
FIG. 4A illustrates a cloud infrastructure in accordance with one embodiment of the invention.

It is to be appreciated that the various components (logical and physical) illustrated in FIGS. 1-3 can be implemented in a distributed virtual infrastructure or cloud infrastructure. FIG. 4A illustrates a cloud infrastructure 410. As shown, the cloud infrastructure 410 comprises virtual machines (VMs) 412-1, 412-2, . . . 412-N implemented using a hypervisor 414. The hypervisor 414 runs on physical infrastructure 416. The cloud infrastructure 410 further comprises sets of applications 418-1, 418-2, . . . 418-N running on respective ones of the virtual machines 412-1, 412-2, . . . 412-N (utilizing associated LUs) under the control of the hypervisor 134.

Although only a single hypervisor 414 is shown in the example of FIG. 4A, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 414 which, as shown in FIG. 4A, is directly inserted on top of the computer hardware in order to allocate hardware resources of the physical computer (physical infrastructure 416) dynamically and transparently. The hypervisor 414 affords the ability for multiple operating systems to run concurrently on a single physical computer and share hardware resources with each other.

An example of a commercially available hypervisor platform that may be used to implement portions of the cloud infrastructure 410 in one or more embodiments of the invention is the VMware® vSphere™ which may have an associated virtual infrastructure management system such as the VMware® vCenter™. The underlying physical infrastructure 416 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 410.

Figure 4B:
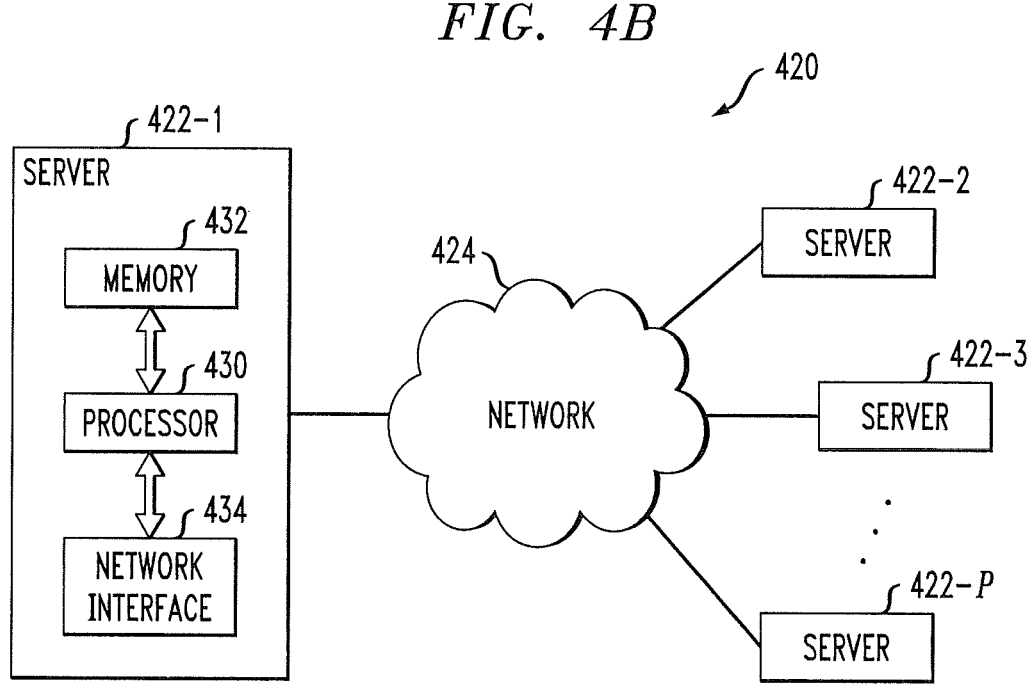
FIG. 4B illustrates a processing platform on which a cloud infrastructure and a virtual storage network construction module are implemented in accordance with one or more embodiments of the invention.

An example of a processing platform on which the cloud infrastructure 410 may be implemented is processing platform 420 shown in FIG. 4B. The processing platform 420 in this embodiment comprises a plurality of servers denoted 422-1, 422-2, 422-3, . . . 422-P which communicate with one another over a network 424. One or more of the components shown in FIGS. 1-3 may therefore each run on one or more storage arrays, servers, computers or other processing platform elements, each of which may be viewed as an example of what is more generally referred to herein as a "processing device." As illustrated in FIG. 4B, such a device generally comprises at least one processor and an associated memory, and implements one or more functional modules for controlling certain features of components shown in FIGS. 1-3. Again, multiple elements or modules may be implemented by a single processing device in a given embodiment.

The server 422-1 in the processing platform 420 comprises a processor 430 coupled to a memory 432. The processor 430 may comprise a microprocessor, a microcontroller, an application-specific integrated circuit (ASIC), a field programmable gate array (FPGA) or other type of processing circuitry, as well as portions or combinations of such circuitry elements. The memory 432 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 422-1 causes the device to perform functions associated with one or more of the components shown in FIGS. 1-3. One skilled in the art would be readily able to implement such software given the teachings provided herein. Other examples of computer program products embodying embodiments of the invention may include, for example, optical or magnetic disks.

Also included in the server 422-1 is network interface circuitry 434, which is used to interface the server with the network 424 and other system components. Such circuitry may comprise conventional transceivers of a type well known in the art.

The other servers 422 of the processing platform 420 are assumed to be configured in a manner similar to that shown for server 422-1 in the figure.

The processing platform 420 shown in FIG. 4B may comprise additional known components such as batch processing systems, parallel processing systems, physical machines, virtual machines, virtual switches, storage volumes, logical units, etc. Again, the particular processing platform shown in FIG. 4B is presented by way of example only, and components shown in FIGS. 1-3 may include additional or alternative processing platforms, as well as numerous distinct processing platforms in any combination.

Also, numerous other arrangements of servers, computers, storage devices or other components are possible for implementing components shown in FIGS. 1-3. Such components can communicate with other components over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
provisioning a data storage system comprising a set of host devices operatively coupled to a set of storage arrays via a set of switching components, wherein the data storage system provisioning step further comprises configuring the set of host devices, the set of switching components, and the set of storage arrays to each support a network port-based virtualization protocol;

enabling one or more tenants of the data storage system to respectively construct and manage one or more virtual storage networks within the data storage system, wherein each of the one or more constructed and tenant-managed virtual storage networks comprises at least one virtual machine, at least one virtual switching component, and at least one virtual storage array with at least one unique address pair assigned according to the network port-based virtualization protocol; and delivering data through a given one of the one or more constructed and tenant-managed virtual storage networks further comprising: receiving the data at a virtual switching component of the given virtual storage network; determining a physical switching component, transparent to the tenant, mapped to the virtual switching component that received the data; forwarding the data from the virtual switching component to the physical switching component and the physical switching component forwarding the data to a physical storage array, transparent to the tenant, mapped to the virtual storage array of the given storage network, and the data being forwarded to the virtual storage array using the unique address pair assigned according to the network port-based virtualization protocol;

wherein the virtual switching component and the virtual storage array are thus respectively isolated from the physical switching component and the physical storage array in the constructed and tenant-managed virtual storage network such that the corresponding tenant is prevented from accessing the physical switching component and the physical storage array which are configurable to implement at least another virtual storage network of at least another tenant;

wherein the steps are executed via at least one processor coupled to a memory.

2. The method of claim 1, wherein each virtual storage array comprises a unique pairing of a port identifier and a world wide port name for each port.

3. The method of claim 2, wherein n-port identifier virtualization is employed with the virtual storage array to manage a mapping between the unique pairing and the physical resources used to implement the virtual storage array.

4. The method of claim 1, wherein each virtual switching component comprises a set of virtual ports that are mapped to a set of physical ports.

5. The method of claim 4, wherein each virtual switching component is n-port virtualization enabled.

6. The method of claim 4, wherein two or more virtual switching components are cascaded to form a cascaded virtual switch.

7. The method of claim 4, wherein data routing from the virtual switching component is configurable by the corresponding tenant managing the corresponding virtual storage network.

8. The method of claim 7, wherein the data routing from the virtual switching component is controlled by a quality-of-service delivery policy.

9. The method of claim 1, wherein the one or more virtual storage networks are implemented in a cloud infrastructure.

10. A computer program product comprising a non-transitory processor-readable storage medium having encoded therein executable code of one or more software programs, wherein the one or more software programs when executed by at least one processor implement the steps of:

provisioning a data storage system comprising a set of host devices operatively coupled to a set of storage arrays via a set of switching components, wherein the data storage system provisioning step further comprises configuring the set of host devices, the set of switching components, and the set of storage arrays to each support a network port-based virtualization protocol;

enabling one or more tenants of the data storage system to respectively construct and manage one or more virtual storage networks within the data storage system, wherein each of the one or more constructed and tenant-managed virtual storage networks comprises at least one virtual machine, at least one virtual switching component, and at least one virtual storage array with at least one unique address pair assigned according to the network port-based virtualization protocol; and delivering data through a given one of the one or more constructed and tenant-managed virtual storage networks further comprising: receiving the data at a virtual switching component of the given virtual storage network; determining a physical switching component, transparent to the tenant, mapped to the virtual switching component that received the data; forwarding the data from the virtual switching component to the physical switching component and the physical switching component forwarding the data to a physical storage array, transparent to the tenant, mapped to the virtual storage array of the given storage network, and the data being forwarded to the virtual storage array using the unique address pair assigned according to the network port-based virtualization protocol;

wherein the virtual switching component and the virtual storage array are thus respectively isolated from the physical switching component and the physical storage array in the constructed and tenant-managed virtual storage network such that the corresponding tenant is prevented from accessing the physical switching component and the physical storage array which are configurable to implement at least another virtual storage network of at least another tenant.

11. An apparatus comprising:

a memory; and a processor operatively coupled to the memory and operative to:

provision a data storage system comprising a set of host devices operatively coupled to a set of storage arrays via a set of switching components, wherein the data storage system provisioning step further comprises configuring the set of host devices, the set of switching components, and the set of storage arrays to each support a network port-based virtualization protocol;

enable one or more tenants of the data storage system to respectively construct and manage one or more virtual storage networks within the data storage system, wherein each of the one or more constructed and tenant-managed virtual storage networks comprises at least one virtual machine, at least one virtual switching component, and at least one virtual storage array with at least one unique address pair assigned according to the network port-based virtualization protocol; and deliver data through a given one of the one or more constructed and tenant-managed virtual storage networks further comprising: receiving the data at a virtual switching component of the given virtual storage network; determining a physical switching component, transparent to the tenant, mapped to the virtual switching component that received the data; forwarding the data from the virtual switching component to the physical switching component and the physical switching component forwarding the data to a physical storage array, transparent to the tenant, mapped to the virtual storage array of the given storage network, and the data being forwarded to the virtual storage array using the unique address pair assigned according to the network port-based virtualization protocol;

wherein the virtual switching component and the virtual storage array are thus respectively isolated from the physical switching component and the physical storage array in the constructed and tenant-managed virtual storage network such that the corresponding tenant is prevented from accessing the physical switching component and the physical storage array which are configurable to implement at least another virtual storage network of at least another tenant.

12. The apparatus of claim 11, wherein each virtual storage array comprises a unique pairing of a port identifier and a world wide port name for each port.

13. The apparatus of claim 12, wherein n-port identifier virtualization is employed with the virtual storage array to manage a mapping between the unique pairing and the physical resources used to implement the virtual storage array.

14. The apparatus of claim 11, wherein each virtual switching component comprises a set of virtual ports that are mapped to a set of physical ports.

15. The apparatus of claim 14, wherein each virtual switching component is n-port virtualization enabled.

16. The apparatus of claim 14, wherein two or more virtual switching components are cascaded to form a cascaded virtual switch.

17. The apparatus of claim 14, wherein data routing from the virtual switching component is configurable by the corresponding tenant managing the corresponding virtual storage network.

18. The apparatus of claim 17, wherein the data routing from the virtual switching component is controlled by a quality-of-service delivery policy.

19. The apparatus of claim 11, wherein the one or more virtual storage networks are implemented in a cloud infrastructure.

20. The method of claim 1, further comprising enabling the given tenant to add at least another virtual storage array to the virtual storage network of the tenant and, transparent to the tenant, mapping the added virtual storage array to another physical storage array in the data storage system.

* * * * *